US012743904B2

(12) United States Patent
Fujino et al.

(10) Patent No.: US 12,743,904 B2
(45) Date of Patent: Sep. 22, 2026

(54) VISUAL RECOGNITION DETERMINATION DEVICE AND CONTROL METHOD FOR VISUAL RECOGNITION DETERMINATION DEVICE

(71) Applicants: TOYOTA JIDOSHA KABUSHIKI KAISHA, Toyota (JP); DENSO CORPORATION, Kariya (JP)

(72) Inventors: Jiro Fujino, Tokyo (JP); Kenichiroh Hara, Yokohama (JP); Satoru Kawakami, Tokyo (JP); Hiroshi Morimoto, Tokyo (JP); Kenta Yamada, Tokyo (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 232 days.

(21) Appl. No.: 18/629,148

(22) Filed: Apr. 8, 2024

(65) Prior Publication Data

US 2024/0378918 A1 Nov. 14, 2024

(30) Foreign Application Priority Data

May 9, 2023 (JP) ................................ 2023-077075

(51) Int. Cl.
*G06V 40/16* (2022.01)
*G06T 7/70* (2017.01)
*G06V 20/59* (2022.01)

(52) U.S. Cl.
CPC .............. *G06V 40/161* (2022.01); *G06T 7/70* (2017.01); *G06V 20/597* (2022.01); *G06T 2207/30201* (2013.01)

(58) Field of Classification Search
None
See application file for complete search history.

(56) References Cited

U.S. PATENT DOCUMENTS

2015/0154461 A1 6/2015 Kitaura et al.
2016/0120403 A1 5/2016 Mochizuki et al.
2019/0256084 A1* 8/2019 Lee ...................... G06V 40/193
2020/0385012 A1* 12/2020 Maruyama ........... G06V 20/597
2022/0083794 A1* 3/2022 Bronte .................... G06F 3/017
2022/0289151 A1* 9/2022 Song .......................... B60L 3/02
2022/0324457 A1* 10/2022 Arora .................... B60W 40/08
2023/0057848 A1* 2/2023 Murata ................ G05D 1/0038
(Continued)

FOREIGN PATENT DOCUMENTS

JP 2014-120113 A 6/2014
JP 2015-127937 A 7/2015
(Continued)

*Primary Examiner* — Henok Shiferaw
*Assistant Examiner* — Xiaomao Ding
(74) *Attorney, Agent, or Firm* — Dinsmore & Shohl LLP

(57) ABSTRACT

A visual recognition determination device for determining whether a driver has visually recognized an object detected by an external sensor of a vehicle is configured to perform estimating a sight-line vector of the driver using a driver monitoring camera of the vehicle, estimating a sight-line conical area which widens in a conical shape away from an eye point of the driver with respect to the sight-line vector of the driver, and determining whether the driver has visually recognized the object based on overlap of the sight-line conical area with the object.

12 Claims, 8 Drawing Sheets

(56) References Cited

U.S. PATENT DOCUMENTS

| | | | | |
|---|---|---|---|---|
| 2023/0311900 | A1* | 10/2023 | Kanehara | G06V 20/56 701/1 |
| 2024/0253568 | A1* | 8/2024 | Corrodi | B60R 1/25 |
| 2024/0300483 | A1* | 9/2024 | Wallin | G06V 20/597 |
| 2024/0362931 | A1* | 10/2024 | Katz | G06V 40/20 |
| 2025/0103134 | A1* | 3/2025 | Watanabe | B60K 35/81 |

FOREIGN PATENT DOCUMENTS

| | | | |
|---|---|---|---|
| JP | 2016-037187 | A | 3/2016 |
| JP | WO2015/019542 | A1 | 3/2017 |
| JP | 2017-168024 | A | 9/2017 |
| JP | 2020-201670 | A | 12/2020 |

* cited by examiner 100
10
VISUAL-RECOGNITION DETERMINING ECU
11
OBJECT RECOGNIZING UNIT
12
SIGHT-LINE CONICAL AREA ESTIMATING UNIT
13
VISUAL RECOGNITION DETERMINING UNIT
1
DRIVER MONITORING CAMERA
2
EXTERNAL SENSOR
3
INTERNAL SENSOR
4
HMI

50
P
EC
EB
EP
60

50
P
EC
EB
EP
60

EC
P
50
60

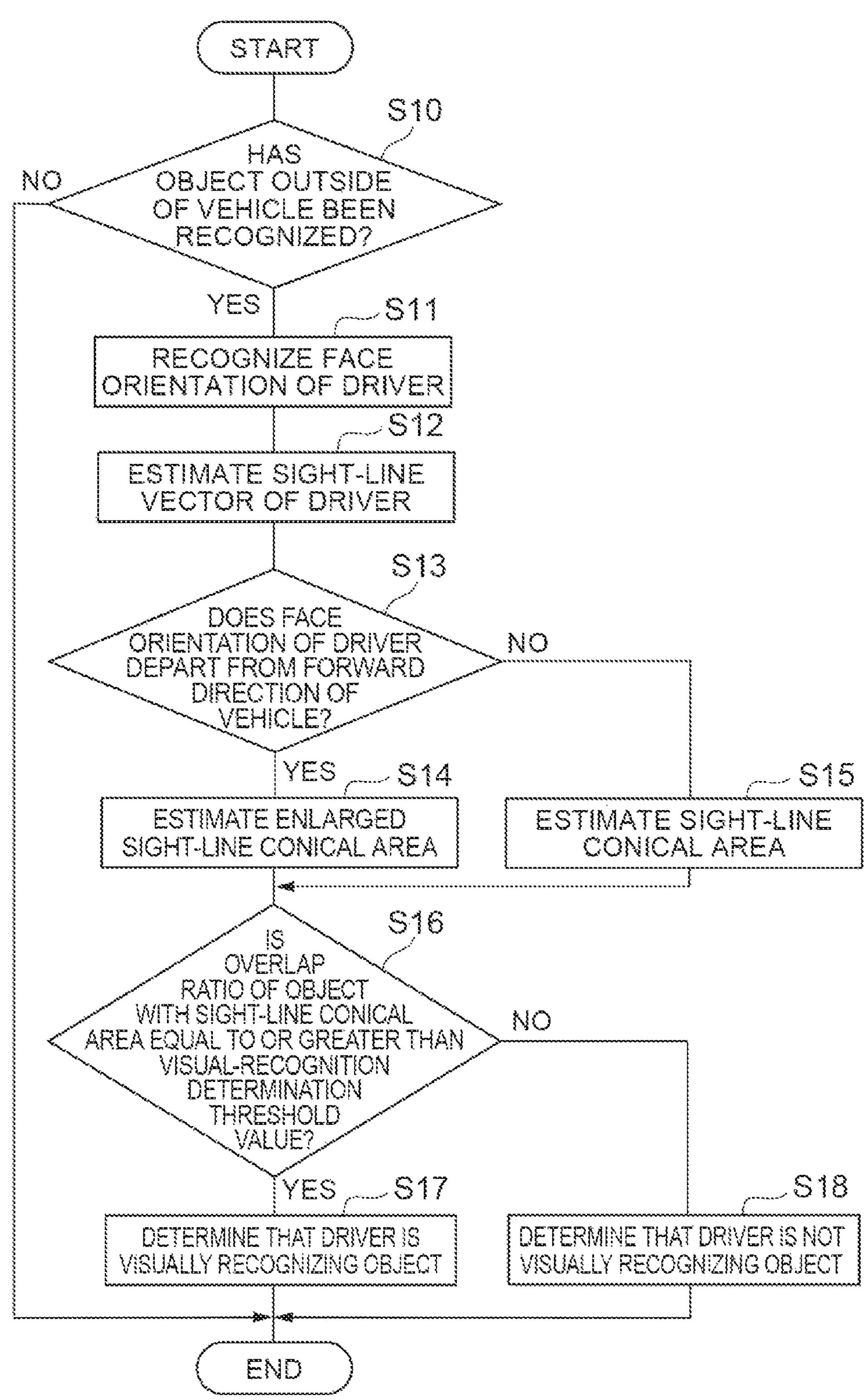
Fig.6
START
S10
HAS OBJECT OUTSIDE OF VEHICLE BEEN RECOGNIZED?
NO
YES
S11
RECOGNIZE FACE ORIENTATION OF DRIVER
S12
ESTIMATE SIGHT-LINE VECTOR OF DRIVER
S13
DOES FACE ORIENTATION OF DRIVER DEPART FROM FORWARD DIRECTION OF VEHICLE?
NO
YES
S14
ESTIMATE ENLARGED SIGHT-LINE CONICAL AREA
S15
ESTIMATE SIGHT-LINE CONICAL AREA
S16
IS OVERLAP RATIO OF OBJECT WITH SIGHT-LINE CONICAL AREA EQUAL TO OR GREATER THAN VISUAL-RECOGNITION DETERMINATION THRESHOLD VALUE?
NO
YES
S17
DETERMINE THAT DRIVER IS VISUALLY RECOGNIZING OBJECT
S18
DETERMINE THAT DRIVER IS NOT VISUALLY RECOGNIZING OBJECT
END

VISUAL RECOGNITION DETERMINATION DEVICE AND CONTROL METHOD FOR VISUAL RECOGNITION DETERMINATION DEVICE

CROSS-REFERENCE TO RELATED APPLICATIONS

This application is based upon and claims the benefit of priority from Japanese Patent Application No. 2023-077075, filed on May 9, 2023, the entire contents of which are incorporated herein by reference.

TECHNICAL FIELD

The present disclosure relates to a visual recognition determination device and a control method for a visual recognition determination device.

BACKGROUND

In the related art, Japanese Unexamined Patent Publication No. 2014-120113 is known as a patent document associated with a visual recognition determination device. In this publication, a device that detects a sight-line position, a sight-line circle, and a visual-field area of a driver from an image captured by a driver monitoring camera, detects a feature object in front of a vehicle in a vehicle traveling direction from an image captured by a front camera, and identifies a mode in which the driver visually recognizes the feature object based on the results of detection is described.

SUMMARY

Estimation accuracy of a sight-line vector based on an image captured by the driver monitoring camera decreases according to a face orientation of a driver. When the estimation accuracy of a sight-line vector decreases, there is concern that it may be erroneously determined that an object visually recognized by the driver has not been visually recognized by the driver.

According to an aspect of the present disclosure, there is provided a visual recognition determination device for determining whether a driver has visually recognized an object detected by an external sensor of a vehicle, the visual recognition determination device including: a sight-line conical area estimating unit configured to estimate a sight-line vector of the driver using a driver monitoring camera of the vehicle and to estimate a sight-line conical area which widens in a conical shape away from an eye point of the driver with respect to the sight-line vector of the driver; and a visual recognition determining unit configured to determine whether the driver has visually recognized the object based on overlap of the sight-line conical area with the object, wherein the sight-line conical area estimating unit estimates the sight-line conical area according to a face orientation of the driver.

With the visual recognition determination device according to the aspect of the present disclosure, since estimation accuracy of a sight-line vector based on an image captured by a driver monitoring camera decreases according to a face orientation of a driver, it is possible to improve accuracy of visual recognition determination for the driver with respect to an object by estimating a sight-line conical area according to the face orientation.

In the visual recognition determination device according to the aspect of the present disclosure, the sight-line conical area estimating unit may increase a magnification of the sight-line conical area based on a distance from the eye point when the face orientation of the driver departs from a forward direction of the vehicle in comparison with a case in which the face orientation of the driver faces the forward direction.

In the visual recognition determination device according to the aspect of the present disclosure, the sight-line conical area estimating unit may estimate the sight-line conical area of which a cross-section perpendicular to the sight-line vector has a vertically long elliptical shape when the face orientation of the driver faces the forward direction of the vehicle and estimate the sight-line conical area of which the cross-section has a horizontally long elliptical shape when the face orientation of the driver departs laterally from the forward direction of the vehicle.

In the visual recognition determination device according to the aspect of the present disclosure, the sight-line conical area estimating unit may decrease a magnification of the sight-line conical area based on a distance from the eye point when a vehicle speed of the vehicle is equal to or greater than a vehicle speed determination threshold value in comparison with a case in which the vehicle speed is less than the vehicle speed determination threshold value.

In the visual recognition determination device according to the aspect of the present disclosure, the sight-line conical area estimating unit may estimate the sight-line conical area such that a cross-section perpendicular to the sight-line vector is enlarged in a turning direction of the vehicle when the vehicle is turning in comparison with a case in which the vehicle is not turning. With the visual recognition determination device, since it is conceivable that a driver intentionally views a turning destination when the vehicle is turning, it is possible to improve accuracy of visual recognition determination for the driver with respect to an object by magnifying the cross-section perpendicular to the sight-line vector of the sight-line conical area in the turning direction of the vehicle.

In the visual recognition determination device according to the aspect of the present disclosure, the sight-line conical area estimating unit may estimate the sight-line conical area such that a cross-section perpendicular to the sight-line vector is enlarged in a moving direction of the object from a viewpoint of the driver when a moving speed of the object from the viewpoint of the driver is equal to or greater than a moving speed threshold value.

In the visual recognition determination device according to the aspect of the present disclosure, the sight-line conical area estimating unit may increase a magnification of the sight-line conical area until the driver is determined not to visually recognize the object after the driver has been determined to visually recognize the object in comparison with before the driver has been determined to visually recognize the object.

According to another aspect of the present disclosure, there is provided a control method for a visual recognition determination device for determining whether a driver has visually recognized an object detected by an external sensor of a vehicle, the control method including: estimating a sight-line vector of the driver using a driver monitoring camera of the vehicle and estimating a sight-line conical area which widens in a conical shape away from an eye point of the driver with respect to the sight-line vector of the driver; estimating the sight-line conical area according to a face orientation of the driver; and determining whether the driver has visually recognized the object based on overlap of the sight-line conical area with the object.

With the control method for a visual recognition determination device according to the other aspect of the present disclosure, since estimation accuracy of a sight-line vector based on an image captured by a driver monitoring camera decreases according to a face orientation of a driver, it is possible to improve accuracy of visual recognition determination for the driver with respect to an object by estimating a size of a sight-line conical area according to the face orientation.

According to the aspects of the present disclosure, it is possible to improve accuracy of visual recognition determination for the driver with respect to an object.

BRIEF DESCRIPTION OF THE DRAWINGS

FIG. 6 is a flowchart illustrating an example of a visual recognition determining process.

DETAILED DESCRIPTION

Hereinafter, an embodiment of the present disclosure will be described with reference to the accompanying drawings.

Figure 1:
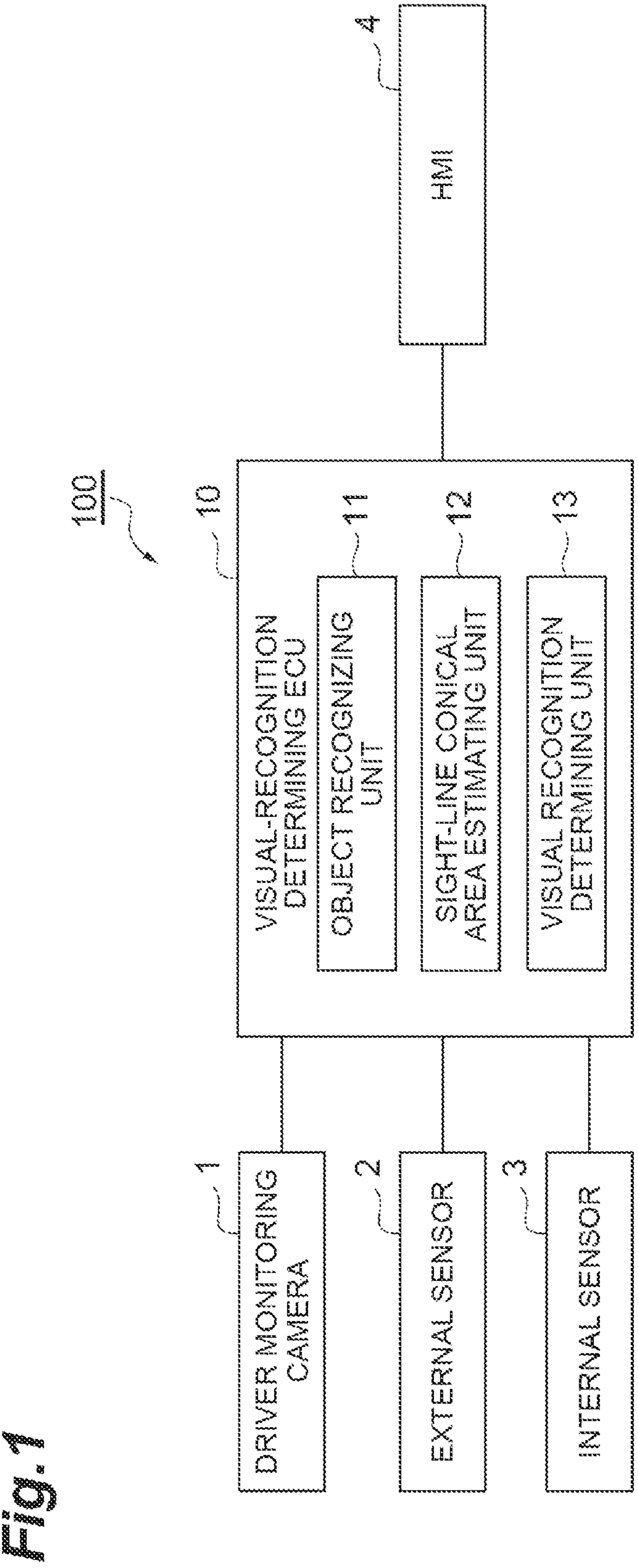
FIG. 1 is a block diagram illustrating a visual recognition determination device according to an embodiment.

FIG. 1 is a block diagram illustrating a visual recognition determination device 100 according to an embodiment. The visual recognition determination device 100 illustrated in FIG. 1 is a device that is mounted in a vehicle such as a car or a truck and determines whether a driver of the vehicle has visually recognized an object outside of the vehicle. Even when a high-level driving support function is mounted in the vehicle, the driver has an obligation to perform surrounding monitoring. There is need for determining whether the driver has appropriately visually recognized an object.

Configuration of Visual Recognition Determination Device

A configuration of the visual recognition determination device 100 according to this embodiment will be described below. As illustrated in FIG. 1, the visual recognition determination device 100 includes a visual-recognition determining electronic control unit (ECU) 10 that comprehensively manages the device. The visual-recognition determining ECU 10 is an electronic control unit including a central processing unit (CPU) and a storage unit such as a read only memory (ROM) or a random-access memory (RAM). The visual-recognition determining ECU 10 realizes various functions, for example, by causing the CPU to execute a program stored in the storage unit. The visual-recognition determining ECU 10 may include a plurality of electronic control units.

The visual-recognition determining ECU 10 is connected to a driver monitoring camera 1, an external sensor 2, an internal sensor 3, and a human-machine interface (HMI) 4.

The driver monitoring camera 1 is a camera for imaging a driver of the vehicle. The driver monitoring camera 1 may be a digital camera including an imaging device such as a charge coupled device (CCD) or a CMOS image sensor (CIS). The driver monitoring camera 1 is provided on a cover of a steering column in front of a driver's seat. The driver monitoring camera 1 images the head of the driver at a predetermined frame rate. The driver monitoring camera 1 may be embedded in the instrument panel in front of the driver's seat or may be provided on the instrument panel. The driver monitoring camera 1 may include a plurality of cameras. The driver monitoring camera 1 transmits a driver captured image to the visual-recognition determining ECU 10.

The external sensor 2 is a detector that detects a surrounding situation of the vehicle. The external sensor 2 includes at least one of a camera and a radar sensor. The camera is an imaging device that images the outside situation of the vehicle. The camera is provided, for example, on the rear surface of the front windshield of the vehicle and captures a forward view image of the vehicle. The camera may include a plurality of imaging devices that image the surroundings of the vehicle in a plurality of directions. The camera transmits imaging information on the outside situation of the vehicle to the visual-recognition determining ECU 10.

The radar sensor is a detector that detects an object near the vehicle using radio waves (for example, millimeter waves) or light. The radar sensor includes, for example, a millimeter wave radar or a Light Detection and Ranging (LIDAR) device. The radar sensor may include a plurality of detectors for detecting an object near the vehicle in a plurality of directions. The radar sensor transmits information on the detected object to the visual-recognition determining ECU 10.

The internal sensor 3 is a detector that detects a traveling state of the vehicle. The internal sensor 3 includes a vehicle speed sensor and a yaw rate sensor. The vehicle speed sensor is a detector that detects a vehicle speed of the vehicle. The vehicle speed sensor transmits information on the detected vehicle speed (wheel speed information) to the visual-recognition determining ECU 10.

The yaw rate sensor is a detector that detects a yaw rate (a rotational angular velocity) around a vertical axis of the center of gravity of the vehicle. For example, a gyro sensor can be used as the yaw rate sensor. The yaw rate sensor transmits information on the detected yaw rate of the vehicle to the visual-recognition determining ECU 10.

The HMI 4 is an interface for inputting and outputting information between the visual-recognition determining ECU 10 and a driver. The HMI 4 includes, for example, a display and a speaker provided in a cabin of the vehicle. The HMI 4 performs the output of an image from the display and the output of sound from the speaker in accordance with a control signal from the visual-recognition determining ECU 10. The display may be a multi-information display (MID), a display of a navigation system, or a head-up display (HUD). The HMI 4 may include various indicators.

A functional configuration of the visual-recognition determining ECU 10 will be described below. The visual-recognition determining ECU 10 includes an object recognizing unit 11, a sight-line conical area estimating unit 12, and a visual recognition determining unit 13. Some functions of the visual-recognition determining ECU 10 which will be described below may be realized by a server that can communicate with the vehicle.

The object recognizing unit 11 recognizes an object outside of the vehicle based on the result of detection from the external sensor 2. An object is a target which is visually recognized by a driver of a vehicle. Examples of the object include mobile objects such as another vehicle, a bicycle, a personal mobility, and a pedestrian. Examples of the object may include stationary objects such as a traffic signal, a road sign, a road information board, and a road marking. The object may be limited to an object located within a visible distance of the driver. The object may be limited to an object located in front of the vehicle.

The object recognizing unit 11 recognizes a relative position of an object with respect to the vehicle and a relative speed of the object with respect to the vehicle. The object recognizing unit 11 may recognize an object through sensor fusion in which an image captured by a camera of the external sensor 2 and a result of detection from the radar sensor are combined. Recognition of an object can employ known techniques, and thus detailed description thereof will be omitted.

The object recognizing unit 11 may recognize a position of an object from a viewpoint of the driver based on the result of detection from the external sensor 2. The position of an object from a viewpoint of the driver means a position of the object from an eye point of the driver.

An eye point of a driver is a position at which an eye of the driver sitting on the driver's seat in the cabin is assumed to be present. The eye point of a driver may be expressed by coordinates in a three-dimensional space. The eye point of the driver is set, for example, with respect to a vehicle body. The eye point of the driver may be a fixed position or may be an adjustable position.

The eye point of the driver may be adjusted based on a position of an eye of the driver recognized from a driver-captured image captured by the driver monitoring camera 1. The eye point of the driver may be adjusted according to a position of the driver's seat, for example, a longitudinal position of a seat cushion. The eye point of the driver may be adjusted according to a tilt of a seatback of the driver's seat. The eye point of the driver may be adjusted based on personal information such as a height or a sitting height of the driver shared by the visual recognition determination device 100. The eye point of the driver can be adjusted using other known techniques.

The object recognizing unit 11 can calculate a position of an object from a viewpoint of the driver based on the result of recognition of the object through sensor fusion. The object recognizing unit 11 may calculate the position of the object from the viewpoint of the driver by performing a viewpoint converting process such that the image captured by the camera of the external sensor 2 becomes an image from the eye point of the driver. The object recognizing unit 11 calculates a moving speed of the object from the viewpoint of the driver based on change with time of the position of the object from the viewpoint of the driver. The object recognizing unit 11 recognizes a size of the object from the viewpoint of the driver.

The object recognizing unit 11 may recognize a type of the object. The type of an object includes a four-wheel vehicle, a two-wheel vehicle, a pedestrian, a traffic signal, and a road marking. The object recognizing unit 11 recognizes the type of the object, for example, using pattern matching. The object recognizing unit 11 may recognize the type of the object from the image captured by the camera of the external sensor 2 through matching using image patterns prepared for each type.

Various types of recognition of an object may be performed using a machine learning model. The machine learning model is, for example, a neural network such as a convolutional neural network (CNN). The neural network can have a structure including a plurality of convolution layers and pooling layers. A deep learning network using deep learning may be used as the neural network.

The sight-line conical area estimating unit 12 estimates a sight-line vector of the driver based on the driver-captured image captured by the driver monitoring camera 1 of the vehicle and estimates a sight-line conical area with respect to the sight-line vector of the driver. The sight-line conical area estimating unit 12 also recognizes a face orientation of the driver.

A sight-line vector of a driver is a vector in a three-dimensional space corresponding to a sight line of the driver extending straight from the eye point of the driver as a start point. A method of estimating a sight-line vector includes a method using a face orientation and a center position of a pupil measured by a corneal reflection method. A machine learning model may be used to estimate the sight line. The estimation of a sight-line vector employs known techniques and thus detailed description thereof will be omitted. The sight-line vector does need to include a length and can be used in a meaning representing a sight-line direction.

Figure 2:
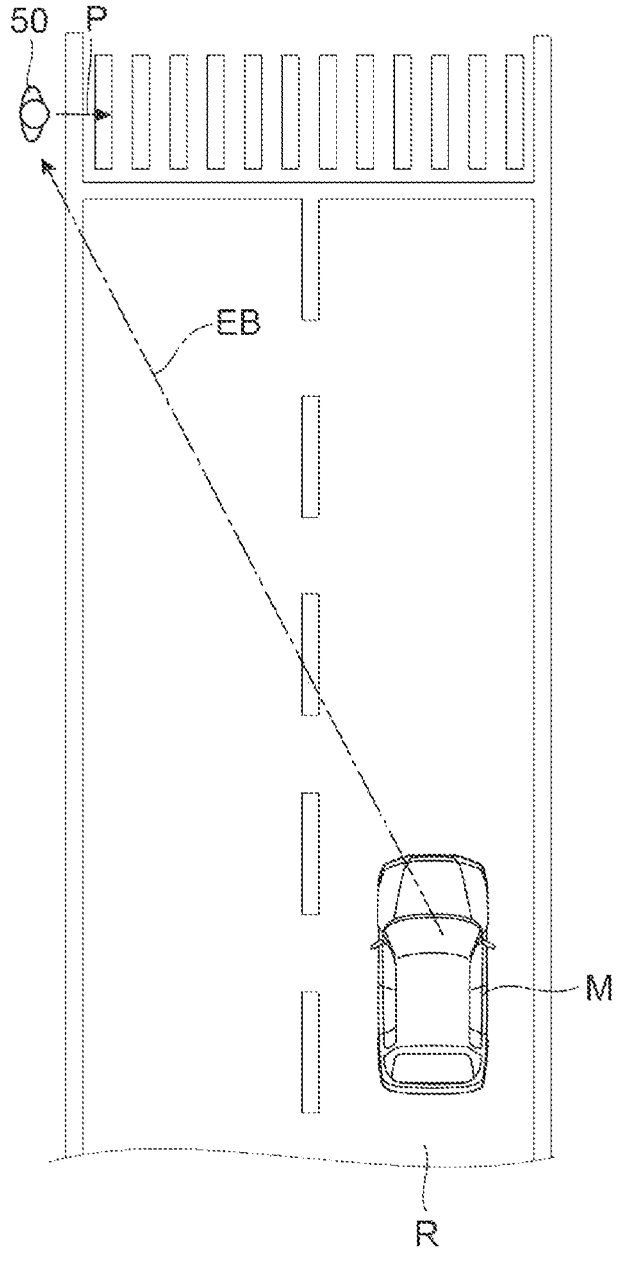
FIG. 2 is a plan view illustrating a sight-line vector of a driver.

FIG. 2 is a plan view illustrating a sight-line vector of a driver. In FIG. 2, a vehicle M, a road R on which the vehicle M travels, a pedestrian 50 (an object), and a sight-line vector EB are illustrated. The pedestrian 50 is a pedestrian who is going to cross a crosswalk in front of the vehicle M. A moving direction of the pedestrian 50 is indicated by an arrow P. As illustrated in FIG. 2, the sight-line vector EB corresponds to a sight line of a driver of the vehicle M viewing the pedestrian 50 who is an object.

Figure 3B:
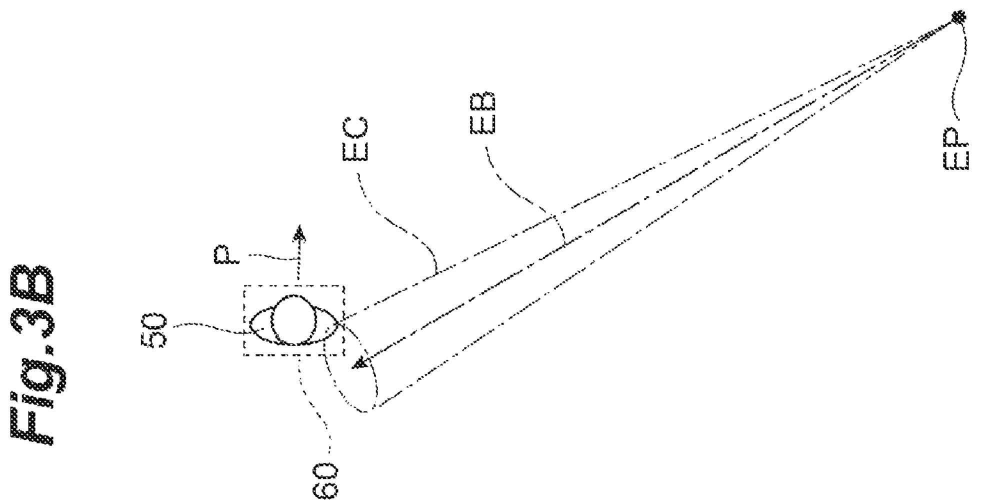
FIG. 3B is a diagram illustrating a situation in which a driver does not visually recognize an object.
Figure 3A:
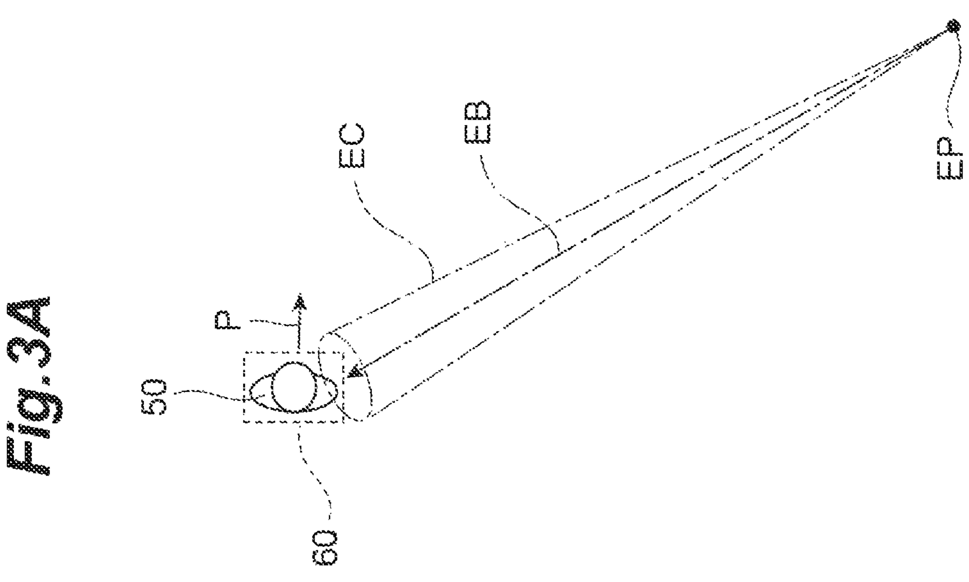
FIG. 3A is a diagram illustrating a situation in which a driver visually recognizes an object.

FIG. 3A is a diagram illustrating an example of a sight-line conical area. In FIG. 3A, a sight-line conical area EC enlarged from the sight-line vector EB with an eye point EP of the driver as a start point is illustrated. In FIG. 3A, a bounding box 60 which is used to determine whether the driver has visually recognized the pedestrian 50 who is an object is illustrated. The bounding box 60 is set to a three-dimensional space and is set, for example, as a rectangular box surrounding the pedestrian 50 with a minimum volume. The bounding box 60 is not necessarily set. FIG. 3B is a diagram illustrating a situation in which the driver does not visually recognize the object. The situation illustrated in FIG. 3B will be described later.

As illustrated in FIG. 3A, the sight-line conical area estimating unit 12 estimates the sight-line conical area EC based on the sight-line vector EB extending from the eye point EP of the driver. The sight-line conical area EC is a conical area in which the sight-line vector EB of the driver is enlarged. The sight-line conical area EC is not necessarily a strict conical shape. A sectional shape of the sight-line conical area EC is not limited to a circular shape or an elliptical shape as long as it is a shape close to a circle or an ellipse as a whole.

The sight-line conical area estimating unit 12 may estimate a sight-line conical area with a size varying according to the object. When a plurality of objects are simultaneously present, the sight-line conical area estimating unit 12 can estimate a plurality of sight-line conical areas used for determination of whether the corresponding objects have been visually recognized based on the sight-line vector of the driver.

The sight-line conical area EC may be estimated in consideration of an effective viewing angle of the driver. An effective visual field is an area which is located at the center of a visual field of a person and in which an object can be recognized with a high resolution. The effective viewing angle (a viewing angle of an effective visual field) has an individual difference and can be set to, for example, 20°. A wide peripheral visual field is present outside of the effective visual field. The peripheral visual field is an area in which an object can be recognized with a low resolution. The sight-line conical area estimating unit 12 may use the effective viewing angle as a vertical angle of the sight-line conical area EC. The sight-line conical area estimating unit 12 may estimate a value not associated with the effective viewing angle as the vertical angle of the sight-line conical area EC.

The sight-line conical area estimating unit 12 can estimate the sight-line conical area EC in consideration of estimate accuracy of the sight-line vector EB. The estimation accuracy of the sight-line vector EB is greatly affected by a face orientation of the driver.

The sight-line conical area estimating unit 12 estimates the sight-line conical area EC according to the face orientation of the driver. The sight-line conical area estimating unit 12 recognizes the face orientation of the driver based on a driver-captured image captured by the driver monitoring camera 1. Recognition of a face orientation of a driver can employ known techniques and thus detailed description thereof will be omitted.

Specifically, when the face orientation of the driver departs from the forward direction of the vehicle M, the sight-line conical area estimating unit 12 can increase a magnification of the sight-line conical area EC based on a distance from the eye point EP in comparison with a case in which the face orientation of the driver faces the forward direction of the vehicle M.

A case in which the face orientation of the driver faces the forward direction of the vehicle M means, for example, a situation in which the face orientation of the driver is included in a setting angle range with respect to an axis parallel to a longitudinal axis of the vehicle M passing through the eye point EP. The setting angle range corresponds to, for example, a range in which the driver monitoring camera 1 can estimate a sight-line vector with high accuracy. The setting angle range may be changed according to specifications of the driver monitoring camera 1 or may be changed according to a positional relationship between the driver monitoring camera 1 and the eye point EP. A case in which the face orientation of the driver departs from the forward direction of the vehicle M is a situation in which the face orientation of the driver is outside of the setting angle range. The direction in which the face orientation of the driver departs is not limited to a horizontal direction and may include a vertical direction.

Figure 4A:
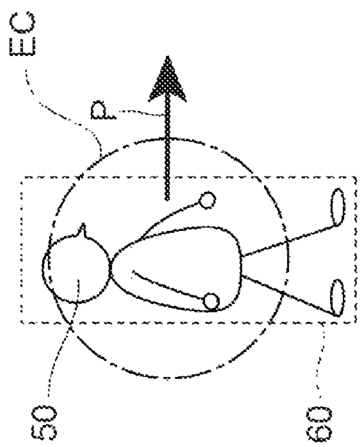
FIG. 4A is a diagram illustrating an example of a cross-section of a sight-line conical area.
Figure 4B:
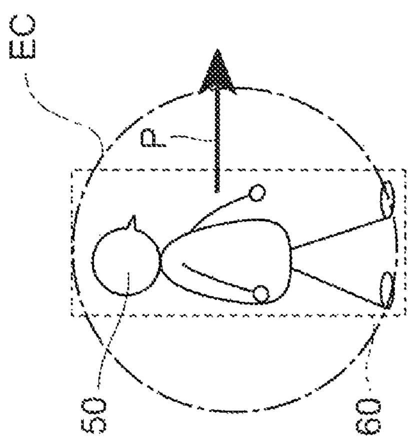
FIG. 4B is a diagram illustrating an example of a cross-section of the sight-line conical area when a magnification is increased.

FIG. 4A is a diagram illustrating an example of a cross-section of the sight-line conical area EC. FIG. 4B is a diagram illustrating an example of a cross-section of the sight-line conical area EC when the magnification is increased. The cross-section of the sight-line conical area EC illustrated in FIG. 4B has a larger circle than the cross-section illustrated in FIG. 4A. When the face orientation of the driver faces the forward direction of the vehicle M, the sight-line conical area estimating unit 12 estimates the sight-line conical area EC with the size illustrated in FIG. 4A. When the face orientation of the driver departs from the forward direction of the vehicle M, the sight-line conical area estimating unit 12 estimates the sight-line conical area EC with a larger size than that in FIG. 4A as illustrated in FIG. 4B.

Since estimation accuracy of a sight-line vector using an image captured by the driver monitoring camera 1 may decrease more as the face orientation of the driver departs more, the sight-line conical area estimating unit 12 can improve accuracy of determination of whether the driver has visually recognized an object by increasing the magnification of the sight-line conical area EC when the face orientation of the driver departs from the forward direction of the vehicle M.

The sight-line conical area estimating unit 12 may estimate the sight-line conical area EC of which a cross-section perpendicular to the sight-line vector EB has a vertically long elliptical shape when the face orientation of the driver faces the forward direction of the vehicle M and estimate the sight-line conical area EC of which a cross-section has a horizontally long elliptical shape when the face orientation of the driver departs horizontally from the forward direction of the vehicle M. Vertically long means that a length in the vertical direction (the up-down direction) of the cross-section perpendicular to the sight-line vector EB is longer than a length in the horizontal direction thereof. Similarly, horizontally long means that the length in the horizontal direction of the cross-section perpendicular to the sight-line vector EB is longer than the length in the vertical direction.

Figures 5A, 5B:
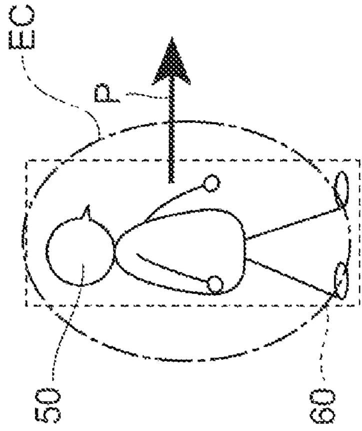
FIG. 5A is a diagram illustrating an example of a vertically long cross-section of a sight-line conical area.
FIG. 5B is a diagram illustrating an example of a horizontally long cross-section of a sight-line conical area.

FIG. 5A is a diagram illustrating an example of a vertically long cross-section of the sight-line conical area EC. FIG. 5B is a diagram illustrating an example of a horizontally long cross-section of the sight-line conical area EC. When the face orientation of the driver faces the forward direction of the vehicle M, the sight-line conical area estimating unit 12 estimates the sight-line conical area EC of which the cross-section has a vertically long elliptical shape as illustrated in FIG. 5A. When the face orientation of the driver departs horizontally from the forward direction of the vehicle M, the sight-line conical area estimating unit 12 estimates the sight-line conical area EC of which the cross-section has a horizontally long elliptical shape as illustrated in FIG. 5B.

When the face orientation of the driver faces the forward direction of the vehicle M, the estimation accuracy of a sight-line vector in a pitch direction of the vehicle M is likely to be lowered, and thus the sight-line conical area estimating unit 12 can avoid erroneous determination that the driver does not visually recognize an object by setting the cross-section of the sight-line conical area EC to a vertically long elliptical shape. Similarly, when the face orientation of the driver departs horizontally from the forward direction of the vehicle M, the estimation accuracy of a sight-line vector in a yaw direction of the vehicle M is likely to be lowered, and thus the sight-line conical area estimating unit 12 can improve accuracy for determining whether the driver has visually recognized an object by setting the cross-section of the sight-line conical area EC to a horizontally long elliptical shape.

The estimation accuracy of the sight-line vector EB changes according to individual differences such as conditions of light applied to the face of the driver, eye glasses, makeup, and faces in addition to the face orientation of the driver. The estimation accuracy of the sight-line vector EB is lowered, for example, when intensive light from the outside reaches the face of the driver and halation is generated in the vicinity of the eyes of the driver. The estimation accuracy of the sight-line vector EB is also lowered when the vicinity of the eyes of the face of the driver is shadowed depending on an application way of light from the outside.

When the driver wears eye glasses, the estimation accuracy of the sight-line vector EB may be lower than when the driver does not wear eye glasses. The estimation accuracy of the sight-line vector EB also changes according to a shape of a rim of eye glasses or the like. When the driver wears makeup such as eyeliner or eyelash extensions near the eyes, the estimation accuracy of the sight-line vector EB may be lowered due to the makeup. The estimation accuracy of the sight-line vector EB may be lowered when an eyelid slants downward due to advanced age or the like as an individual difference of the driver. When there is a lowering factor of the estimation accuracy of the sight-line vector EB, the sight-line conical area estimating unit 12 may increase the magnification of the sight-line conical area EC in comparison with a case in which there is no estimation accuracy lowering factor.

The sight-line conical area estimating unit 12 may estimate the sight-line conical area EC according to a vehicle speed of the vehicle M. It is known that an effective viewing angle of a driver changes according to a vehicle speed. Specifically, when the vehicle speed of the vehicle M is equal to or greater than a vehicle-speed determination threshold value, the sight-line conical area estimating unit 12 may decrease the magnification of the sight-line conical area EC based on a distance from the eye point EP in comparison with a case in which the vehicle speed is less than the vehicle-speed determination threshold value. The vehicle-speed determination threshold value is a preset threshold value. The vehicle-speed determination threshold value may be 40 km/h, 50 km/h, or 60 km/h. The vehicle-speed determination threshold value is not particularly limited.

Since an effective viewing angle of a driver is narrowed when the vehicle speed is high, the sight-line conical area estimating unit 12 can decrease the magnification of the sight-line conical area EC to improve accuracy of visual recognition determination for the driver with respect to an object when the vehicle speed is equal to or greater than the vehicle-speed determination threshold value.

The sight-line conical area estimating unit 12 may set the effective viewing angle to a fixed value common to all drivers or may set the effective viewing angle to individual values for the drivers when personal authentication of each driver is performed. The values of the effective viewing angle of the drivers can be set, for example, based on age, height, and sex of the drivers. The sight-line conical area estimating unit 12 may examine a driver in association with the effective viewing angle by projecting a virtual object onto a front windshield and causing the driver to move the sight line in a range in which the driver is considered to visually recognize the object, or the like at the time of registration of the driver. The sight-line conical area estimating unit 12 may set the value of the individual effective viewing angles of the drivers in consideration of examination results of the drivers in association with the effective viewing angle.

The sight-line conical area estimating unit 12 may estimate the sight-line conical area EC according to a traveling state of the vehicle M. Specifically, when the vehicle M is turning, the sight-line conical area estimating unit 12 may estimate the sight-line conical area such that the cross-section perpendicular to the sight-line vector EB is enlarged in the turning direction (rightward or leftward) of the vehicle M in comparison with a case in which the vehicle M is not turning.

The sight-line conical area estimating unit 12 determines whether the vehicle M is turning, for example, based on yaw rate information detected by the yaw rate sensor of the internal sensor 3. When the yaw rate of the vehicle M is equal to or greater than a turning threshold value, the sight-line conical area estimating unit 12 determines that the vehicle M is turning. The sight-line conical area estimating unit 12 may determine whether the vehicle M is turning based on a steering angle of the vehicle M. When the steering angle of the vehicle M is equal to or greater than a turning steering-angle threshold value, the sight-line conical area estimating unit 12 determines that the vehicle M is turning. The turning threshold value and the turning steering-angle threshold value are preset threshold values.

When the vehicle M is turning, the sight-line conical area estimating unit 12 estimates the sight-line conical area EC such that the cross-section is enlarged in the turning direction of the vehicle M. Referring to FIG. 5B, for example, when the turning direction matches the arrow P illustrated in FIG. 5B, the sight-line conical area estimating unit 12 estimates the sight-line conical area EC of which the cross-section is enlarged in the turning direction as illustrated in FIG. 5B. At this time, a vertical width of the sight-line conical area EC may be the same as when the vehicle M is not turning or may be set to be shorter than when the vehicle M is not turning.

The sight-line conical area estimating unit 12 enlarges the cross-section perpendicular to the sight-line vector of the sight-line conical area in the turning direction of the vehicle. This is because the driver is considered to consciously visually recognize a turning destination when the vehicle is turning. The sight-line conical area estimating unit 12 can improve accuracy of visual recognition determination for a driver with respect to an object by enlarging the sight-line conical area in the turning direction.

When a moving speed of an object from a viewpoint of a driver is equal to or greater than a moving speed threshold value, the sight-line conical area estimating unit 12 may estimate the sight-line conical area EC such that the cross-section is enlarged in a moving direction of the object from a viewpoint of the driver. The moving speed of the object from a viewpoint of the driver is recognized by the object recognizing unit 11. The moving speed threshold value is a preset threshold value.

Referring to FIG. 5B, for example, when the moving speed of the pedestrian 50 is equal to or greater than the moving speed threshold value, the sight-line conical area estimating unit 12 estimates the sight-line conical area EC of which the cross-section is enlarged in the moving direction P of the pedestrian 50 as illustrated in FIG. 5B. In this situation, the driver is considered to visually recognize the object in consideration of movement of the object of which the moving speed is high. Accordingly, the sight-line conical area is estimated such that the cross-section is enlarged in the moving direction of the object. As a result, it is possible to improve accuracy of visual recognition determination for the driver with respect to the object.

After the driver has been determined to visually recognize an object and until the driver is determined not to visually recognize the object, the sight-line conical area estimating unit 12 may increase the magnification of the sight-line conical area EC in comparison with before the driver visually recognizes the object. Visual recognition determination of an object is performed by the visual recognition determining unit 13 which will be described later.

Referring back to FIGS. 4A and 4B, after the driver illustrated in FIG. 4A has been determined to visually recognize a pedestrian 50 and until the driver is determined not to visually recognize the pedestrian 50, the sight-line conical area estimating unit 12 may increase the magnification of the sight-line conical area EC as illustrated in FIG. 4B in comparison with that in FIG. 4A before the driver visually recognizes the object. Since it is considered that there is a high likelihood that the driver visually recognizes an object even when the sight line of the driver departs from the object visually recognized one time, the sight-line conical area estimating unit 12 can improve accuracy of visual recognition determination for the driver with respect to the object by increasing the magnification of the sight-line conical area.

The sight-line conical area estimating unit 12 can estimate the sight-line conical area EC in consideration of recognition accuracy of an object. The recognition accuracy of an object includes recognition accuracy of a position of the object or a size of the object. The recognition accuracy of an object changes according to a detection error of the external sensor 2, a relative speed of the object with respect to the vehicle M, and the like. The method of calculating the detection error of the external sensor 2 can employ known techniques and thus detailed description thereof will be omitted.

When the detection error of the external sensor 2 is equal to or greater than an error threshold value, there is a likelihood that recognition accuracy of an object is lowered in comparison with a case in which the detection error is less than the error threshold value, and thus the sight-line conical area estimating unit 12 may increase the magnification of the sight-line conical area EC.

When the relative speed of the object with respect to the vehicle M is equal to or greater than a relative speed threshold value, there is a likelihood that the recognition accuracy of the object is lowered in comparison with a case in which the relative speed of the object with respect to the vehicle M is less than the relative speed threshold value, and thus the sight-line conical area estimating unit 12 may increase the magnification of the sight-line conical area EC. The error threshold value and the relative speed threshold value are preset threshold values.

When erroneous size recognition in which a size of an object is erroneously recognized to be larger occurs, the sight-line conical area estimating unit 12 may decrease the magnification of the sight-line conical area EC in comparison with a case in which the erroneous size recognition does not occur. Occurrence of erroneous size recognition can be determined based on information of the detection error of the external sensor 2 or a size estimation error included in fusion information. Occurrence of erroneous size recognition can be determined using known techniques.

The sight-line conical area estimating unit 12 may estimate the sight-line conical area EC based on a position of an object relative to the vehicle M. Specifically, the sight-line conical area estimating unit 12 may estimate the sight-line conical area EC of which the cross-section is horizontally long as the position of the object departs horizontally from the forward direction of the vehicle M. The sight-line conical area estimating unit 12 may estimate the sight-line conical area EC according to the type of the object. Specifically, when a type of an object is a two-wheel vehicle, the object is more likely to be missed in comparison with a case in which the type of the object is a four-wheel vehicle, and thus the sight-line conical area estimating unit 12 may decrease the magnification of the sight-line conical area EC. The decrease in magnification of the sight-line conical area EC can be applied to an object which is likely to be missed such as a pedestrian in addition to a two-wheel vehicle.

The visual recognition determining unit 13 determines whether the driver has visually recognized an object based on the object recognized by the object recognizing unit 11 and the sight-line conical area EC of the drive estimated by the sight-line conical area estimating unit 12. The visual recognition determining unit 13 determines whether the driver has visually recognized the object, for example, based on overlap between the sight-line conical area EC and the object in a three-dimensional coordinate system with the vehicle M or the eye point of EP of the driver as an origin.

For example, when an overlap ratio between the sight-line conical area EC and the object is equal to or greater than a visual-recognition determination threshold value, the visual recognition determining unit 13 determines that the driver visually recognizes the object (see FIG. 3A). When then overlap ratio between the sight-line conical area EC and the object is less than the visual-recognition determination threshold value, the visual recognition determining unit 13 determines that the driver does not visually recognize the object (see FIG. 3B). The visual-recognition determination threshold value is a preset threshold value. The visual-recognition determination threshold value may be 0.3, 0.4, or 0.5. The visual-recognition determination threshold value is not particularly limited.

The overlap ratio is a ratio at which the object overlaps the sight-line conical area EC. The object itself may be used to calculate the overlap ratio, or the bounding box 60 illustrated in FIGS. 3A to 4B may be used.

The visual recognition determining unit 13 may determine whether the driver has visually recognized the object based on overlap of the object with the sight-line conical area EC in a two-dimensional coordinate system. The visual recognition determining unit 13 may project the object and the sight-line conical area EC onto a captured image subjected to viewpoint conversion such that the eye point EP of the driver is a reference and calculate a ratio of the object occupying the range of the sight-line conical area EC in the captured image as the overlap ratio. The visual recognition determining unit 13 may calculate the overlap ratio of the object to the sight-line conical area EC using other known techniques. The visual recognition determining unit 13 determines that the driver visually recognizes the object when the overlap ratio of the object to the sight-line conical area EC is equal to or greater than the visual-recognition determination threshold value.

The visual recognition determining unit 13 may determine whether the driver has visually recognized an object using a machine learning model based on overlap of the object with the sight-line conical area EC in a three-dimensional coordinate system or a two-dimensional coordinate system.

When a state in which the overlap ratio of the object to the sight-line conical area EC is equal to or greater than the visual-recognition determination threshold value is maintained for a predetermined time, the visual recognition determining unit 13 may determine that the driver visually recognizes the object. In the nighttime, the visual recognition determining unit 13 may change the predetermined time to a longer time in comparison with in the daytime. The predetermined time may be set to different times according to the type of the object.

The visual recognition determining unit 13 may perform attraction of attention of the driver or provision of information to the driver in consideration of the visual recognition determination result. The visual recognition determining unit 13 performs attraction of attention of the driver or provision of information to the driver by transmitting a control signal to the HMI 4. The visual recognition determining unit 13 performs attraction of attention to the object which is not visually recognized by the driver, for example, by the output sound from the speaker of the HMI 4 or displaying an image on the display. The visual recognition determining unit 13 may perform provision of information on the object which is visually recognized by the driver by the output sound from the speaker or displaying an image on the display. In addition, the visual recognition determining unit 13 may transmit the visual recognition determination result of the driver on the object to a driving support system or an automated driving system of the vehicle M.

Control Method for Visual Recognition Determination Device

A control method for the visual recognition determination device 100 according to this embodiment will be described below with reference to the drawings. FIG. 6 is a flowchart illustrating an example of a visual recognition determination process. The visual recognition determination process is performed, for example, when an ignition switch of the vehicle M is turned on.

As illustrated in FIG. 6, the visual-recognition determining ECU 10 of the visual recognition determination device 100 determines whether an object outside of the vehicle M has been recognized by the object recognizing unit 11 in S10. The object recognizing unit 11 recognizes an object, for example, through sensor fusion. When it is determined that an object has been recognized (S10: YES), the visual-recognition determining ECU 10 performs S11. When it is determined that an object has not been recognized (S10: NO), the visual-recognition determining ECU 10 ends the visual recognition determination process. The visual-recognition determining ECU 10 repeatedly performs the process from S10 after a predetermined time has elapsed.

In S11, the visual-recognition determining ECU 10 recognizes a face orientation of the driver using the sight-line conical area estimating unit 12. The sight-line conical area estimating unit 12 recognizes the face orientation of the driver based on a driver-captured image from the driver monitoring camera 1. Thereafter, the visual-recognition determining ECU 10 performs S12.

In S12, the visual-recognition determining ECU 10 estimates a sight-line vector EB of the driver using the sight-line conical area estimating unit 12. The sight-line conical area estimating unit 12 estimates the sight-line vector EB of the driver extending from the eye point EP of the driver based on the driver-captured image from the driver monitoring camera 1. Thereafter, the visual-recognition determining ECU 10 performs S13. Recognition of the face orientation of the driver and estimation of the sight-line vector EB of the driver may be performed simultaneously.

In S13, the visual-recognition determining ECU 10 determines whether the face orientation of the driver departs from the forward direction of the vehicle M using the sight-line conical area estimating unit 12. When it is determined that the face orientation of the driver departs from the forward direction of the vehicle M (S13: YES), the visual-recognition determining ECU 10 performs S14. When it is determined that the face orientation of the driver does not depart from the forward direction of the vehicle M (S13: NO), the visual-recognition determining ECU 10 performs S15.

In S14, the visual-recognition determining ECU 10 estimates a sight-line conical area EC which is enlarged in comparison with in the case of S15 which will be described later using the sight-line conical area estimating unit 12. The enlarged sight-line conical area EC means that the magnification of the sight-line conical area EC based on a distance from the eye point EP is increased. The sight-line conical area estimating unit 12 sets the sight-line conical area EC which is enlarged in a conical shape with respect to the sight-line vector EB. The sight-line conical area estimating unit 12 may estimate the sight-line conical area EC of which the cross-section is horizontally long as illustrated in FIG. 5B. Thereafter, the visual-recognition determining ECU 10 performs S16.

In S15, the visual-recognition determining ECU 10 estimates the sight-line conical area EC using the sight-line conical area estimating unit 12. Here, enlargement of the sight-line conical area EC based on the face orientation of the driver is not performed. The sight-line conical area estimating unit 12 may estimate the sight-line conical area EC of which the cross-section is vertically long as illustrated in FIG. 5A. Thereafter, the visual-recognition determining ECU 10 performs S16.

In S16, the visual-recognition determining ECU 10 determines whether the overlap ratio of the object to the sight-line conical area EC is equal to or greater than the visual-recognition determination threshold value using the visual recognition determining unit 13. When it is determined that the overlap ratio of the object to the sight-line conical area EC is equal to or greater than the visual-recognition determination threshold value (S16: YES), the visual-recognition determining ECU 10 performs S17. When it is determined that the overlap ratio of the object to the sight-line conical area EC is not equal to nor greater than the visual-recognition determination threshold value (S16: NO), the visual-recognition determining ECU 10 performs S18.

In S17, the visual-recognition determining ECU 10 determines that the driver visually recognizes the object using the visual recognition determining unit 13. The visual recognition determining unit 13 transmits the visual recognition determination result of the driver to the driving support system or the automated driving system of the vehicle M. Thereafter, the visual-recognition determining ECU 10 ends the visual recognition determination process and repeats the process from S10 after a predetermined time has elapsed.

In S18, the visual-recognition determining ECU 10 determines that the driver does not visually recognize the object using the visual recognition determining unit 13. The visual recognition determining unit 13 transmits the visual recognition determination result of the driver to the driving support system or the automated driving system of the vehicle M. Thereafter, the visual-recognition determining ECU 10 ends the visual recognition determination process and repeats the process from S10 after a predetermined time has elapsed.

Figure 7A:
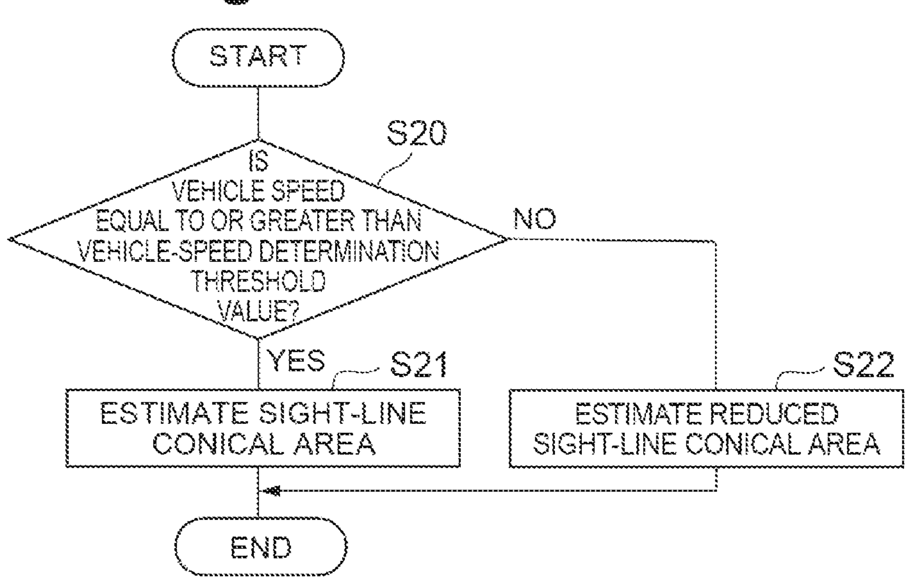
FIG. 7A is a flowchart illustrating an example of a sight-line conical area estimating process based on a vehicle speed.

The visual-recognition determining ECU 10 may estimate the sight-line conical area EC according to various states other than the face orientation of the driver. FIG. 7A is a flowchart illustrating an example of a sight-line conical area estimating process based on a vehicle speed. The sight-line conical area estimating process can be performed, for example, between S12 and S13 in the flowchart illustrated in FIG. 6. The sight-line conical area estimating process may be performed between S14 or S15 and S16. The same is true of various sight-line conical area estimating processes which will be described later.

As illustrated in FIG. 7A, in S20, the visual-recognition determining ECU 10 determines whether the vehicle speed of the vehicle M is equal to or greater than the vehicle-speed determination threshold value using the sight-line conical area estimating unit 12. When it is determined that the vehicle speed is equal to or greater than the vehicle-speed determination threshold value (S20: YES), the visual-recognition determining ECU 10 performs S21. When it is determined that the vehicle speed is not equal to nor greater than the vehicle-speed determination threshold value (S20: NO), the visual-recognition determining ECU 10 performs S22.

In S21, the visual-recognition determining ECU 10 estimates the sight-line conical area EC using the sight-line conical area estimating unit 12. In this case, change of the sight-line conical area EC according to the vehicle speed is not performed. Thereafter, the visual-recognition determining ECU 10 ends the sight-line conical area estimating process.

In S22, the visual-recognition determining ECU 10 estimates the sight-line conical area EC which is reduced in comparison with the case of S21 using the sight-line conical area estimating unit 12. The reduced sight-line conical area EC means that the magnification of the sight-line conical area EC according to the distance from the eye point EP is decreased. Thereafter, the visual-recognition determining ECU 10 ends the sight-line conical area estimating process.

Figure 7B:
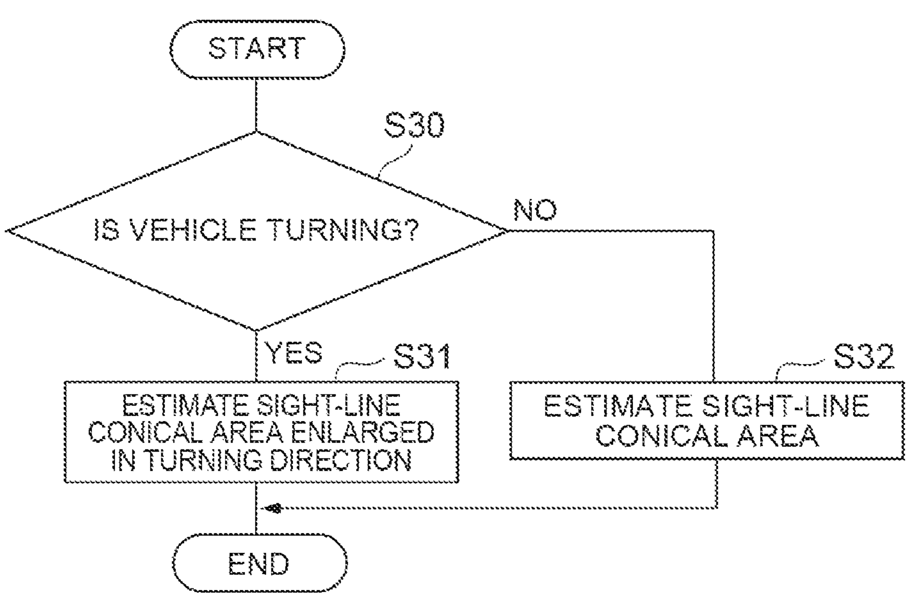
FIG. 7B is a flowchart illustrating an example of a sight-line conical area estimating process based on turning of a vehicle.

FIG. 7B is a flowchart illustrating an example of a sight-line conical area estimating process based on turning of the vehicle. As illustrated in FIG. 7B, in S30, the visual-recognition determining ECU 10 determines whether the vehicle M is turning using the sight-line conical area estimating unit 12. The sight-line conical area estimating unit 12 determines whether the vehicle M is turning based on the yaw rate of the vehicle M or the steering angle of the vehicle M. When it is determined that the vehicle M is turning (S30: YES), the visual-recognition determining ECU 10 performs S31. When it is determined that the vehicle M is not turning (S30: NO), the visual-recognition determining ECU 10 performs S32.

In S31, the visual-recognition determining ECU 10 estimates the sight-line conical area EC which is enlarged in the turning direction of the vehicle M in comparison with the case of S32 which will be described later using the sight-line conical area estimating unit 12. The sight-line conical area EC enlarged in the turning direction of the vehicle M means the sight-line conical area EC of which the cross-section perpendicular to the sight-line vector EB is enlarged in the turning direction of the vehicle M. Thereafter, the visual-recognition determining ECU 10 ends the sight-line conical area estimating process.

In S32, the visual-recognition determining ECU 10 estimates the sight-line conical area EC using the sight-line conical area estimating unit 12. In this case, change of the sight-line conical area EC according to the turning of the vehicle M is not performed. Thereafter, the visual-recognition determining ECU 10 ends the sight-line conical area estimating process.

Figure 8A:
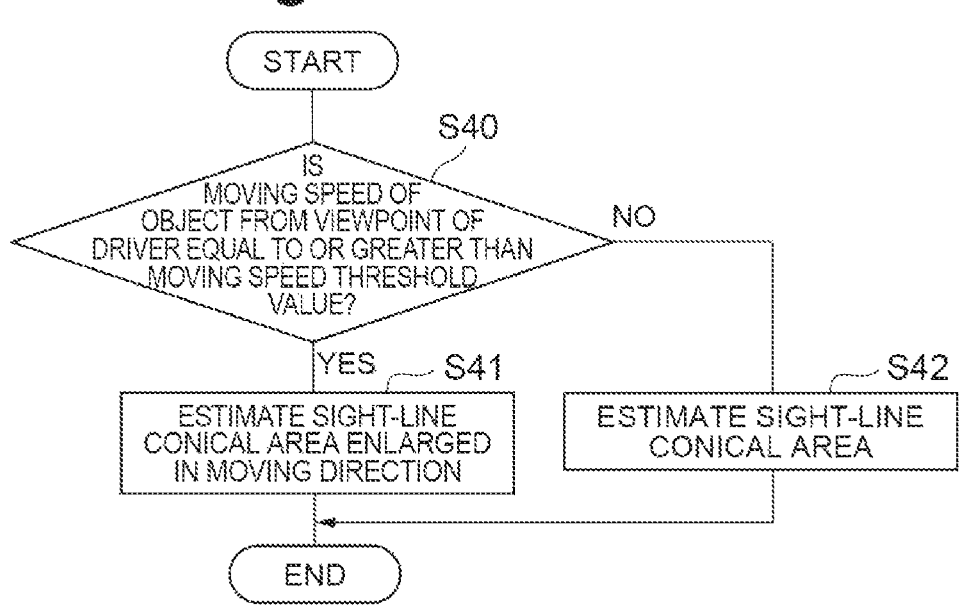
FIG. 8A is a flowchart illustrating an example of a sight-line conical area estimating process based on a moving speed of an object.

FIG. 8A is a flowchart illustrating an example of a sight-line conical area estimating process based on a moving speed of an object. As illustrated in FIG. 8A, in S40, the visual-recognition determining ECU 10 determines whether a moving speed of an object from a viewpoint of the driver is equal to or greater than the moving speed threshold value using the sight-line conical area estimating unit 12. When it is determined that the moving speed of the object from the viewpoint of the driver is equal to or greater than the moving speed threshold value (S40: YES), the visual-recognition determining ECU 10 performs S41. When it is determined that the moving speed of the object from the viewpoint of the driver is not equal to nor greater than the moving speed threshold value (S40: NO), the visual-recognition determining ECU 10 performs S42.

In S41, the visual-recognition determining ECU 10 estimates the sight-line conical area EC which is enlarged in the moving direction of the object in comparison with the case of S42 which will be described later using the sight-line conical area estimating unit 12. The sight-line conical area EC enlarged in the moving direction of the object means a sight-line conical area EC of which the cross-section perpendicular to the sight-line vector EB is enlarged in the moving direction of the object. Thereafter, the visual-recognition determining ECU 10 ends the sight-line conical area estimating process.

In S42, the visual-recognition determining ECU 10 estimates the sight-line conical area EC using the sight-line conical area estimating unit 12. In this case, change of the sight-line conical area EC according to the moving speed of the object is not performed. Thereafter, the visual-recognition determining ECU 10 ends the sight-line conical area estimating process.

Figure 8B:
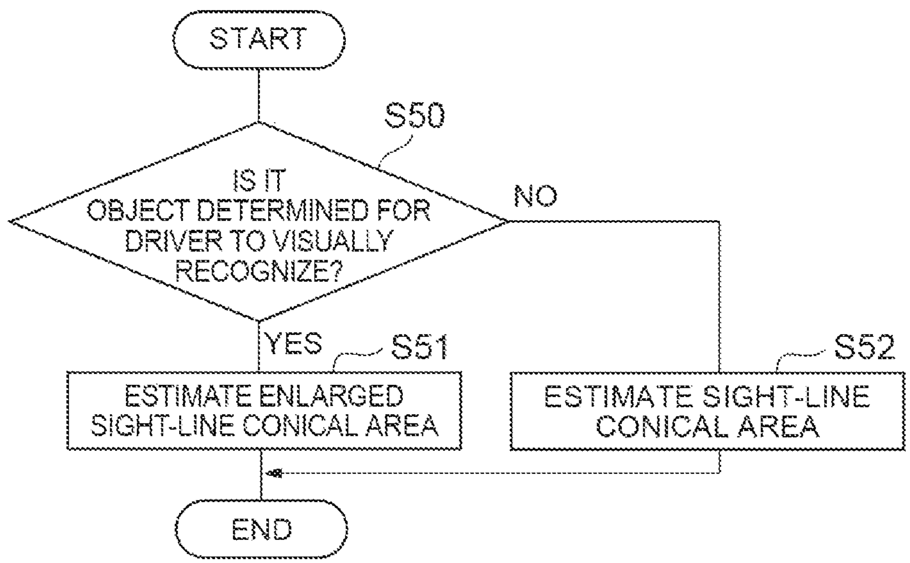
FIG. 8B is a flowchart illustrating an example of a sight-line conical area estimating process based on a visual-recognition state of a driver.

FIG. 8B is a flowchart illustrating an example of a sight-line conical area estimating process based on a visual-recognition state of the driver. As illustrated in FIG. 8B, in S50, the visual-recognition determining ECU 10 determines whether a target object of the visual recognition determination process is an object determined for the driver to visually recognize using the sight-line conical area estimating unit 12. When it is determined that the target object of the visual recognition determination process is an object determined for the driver to visually recognize (S50: YES), the visual-recognition determining ECU 10 performs S51. When it is determined that the target object of the visual recognition determination process is not an object determined for the driver to visually recognize (S50: NO), the visual-recognition determining ECU 10 performs S52.

In S51, the visual-recognition determining ECU 10 estimates the sight-line conical area EC which is enlarged in comparison with the case of S52 which will be described later using the sight-line conical area estimating unit 12. Thereafter, the visual-recognition determining ECU 10 ends the sight-line conical area estimating process.

In S52, the visual-recognition determining ECU 10 estimates the sight-line conical area EC using the sight-line conical area estimating unit 12. In this case, change of the sight-line conical area EC according to whether an object has been visually recognized is not performed. Thereafter, the visual-recognition determining ECU 10 ends the sight-line conical area estimating process.

With the visual recognition determination device 100 (and the control method for the visual recognition determination device 100) according to this embodiment, the estimation accuracy of a sight-line vector EB based on a captured image from the driver monitoring camera 1 is lowered according to a face orientation of a driver. Accordingly, by estimating the sight-line conical area EC according to the face orientation, it is possible to improve accuracy of visual recognition determination for a driver with respect to an object.

With the visual recognition determination device 100, when the face orientation of the driver faces the forward direction of the vehicle M, the estimation accuracy of a sight-line vector in the pitch direction of the vehicle M is low. Accordingly, a sight-line conical area EC of which the cross-section has a vertically long elliptical shape is estimated. When the face orientation of the driver departs horizontally from the forward direction of the vehicle M, the estimation accuracy of a sight-line vector in the yaw direction of the vehicle M is low. As a result, the sight-line conical area EC of which the cross-section has a horizontally long elliptical shape is estimated. Accordingly, it is possible to improve accuracy of visual recognition determination for the driver with respect to an object.

With the visual recognition determination device 100, since the effective viewing angle of the driver is narrowed when the vehicle speed is high, it is possible to improve accuracy of visual recognition determination for the driver with respect to an object by decreasing the magnification of the sight-line conical area when the vehicle speed is equal to or greater than the vehicle-speed determination threshold value.

With the visual recognition determination device 100, since a driver can be considered to consciously visually recognize a turning destination when the vehicle M is turning, it is possible to improve accuracy of visual recognition determination for the driver with respect to an object by enlarging the cross-section of the sight-line conical area EC perpendicular to the sight-line vector in the turning direction of the vehicle M.

With the visual recognition determination device 100, since a driver intends to visually recognize an object in consideration of movement of the object when a moving speed of the object from a viewpoint of the driver is high, it is possible to improve accuracy of visual recognition determination for the driver with respect to the object by estimating the sight-line conical area EC such that the cross-section perpendicular to the sight-line vector is enlarged in the moving direction of the object.

With the visual recognition determination device 100, since it is considered that the driver is likely to visually recognize an object when the driver's sight line departs slightly from the object which has been visually recognized one time, it is possible to improve accuracy of visual recognition determination for the driver with respect to the object by increasing the magnification of the sight-line conical area EC.

While an embodiment of the present disclosure has been described above, the present disclosure is not limited to the embodiment. The present disclosure can be embodied in various forms subjected to various estimations and improvements based on knowledge of those skilled in the art in addition to the embodiment.

What is claimed is:

1. A visual recognition determination device for determining whether a driver has visually recognized an object detected by an external sensor of a vehicle, the visual recognition determination device comprising:

an electronic control unit configured to:

estimate a sight-line vector of the driver using a driver monitoring camera of the vehicle;

estimate a sight-line conical area which widens in a conical shape away from an eye point of the driver with respect to the sight-line vector of the driver; and determine whether the driver has visually recognized the object based on overlap of the sight-line conical area with the object, wherein the electronic control unit estimates the sight-line conical area according to a face orientation of the driver, and wherein the electronic control unit estimates the sight-line conical area of which a cross-section perpendicular to the sight-line vector has a vertically long elliptical shape when the face orientation of the driver faces a forward direction of the vehicle and estimates the sight-line conical area of which the cross-section has a horizontally long elliptical shape when the face orientation of the driver departs laterally from the forward direction of the vehicle.

2. The visual recognition determination device according to claim 1, wherein the electronic control unit increases a magnification of the sight-line conical area based on a distance from the eye point when the face orientation of the driver departs from a forward direction of the vehicle in comparison with a case in which the face orientation of the driver faces the forward direction.

3. The visual recognition determination device according to claim 2, wherein the electronic control unit decreases a magnification of the sight-line conical area based on a distance from the eye point when a vehicle speed of the vehicle is equal to or greater than a vehicle speed determination threshold value in comparison with a case in which the vehicle speed is less than the vehicle speed determination threshold value.

4. The visual recognition determination device according to claim 2, wherein the electronic control unit estimates the sight-line conical area such that the cross-section perpendicular to the sight-line vector is enlarged in a turning direction of the vehicle when the vehicle is turning in comparison with a case in which the vehicle is not turning.

5. The visual recognition determination device according to claim 2, wherein the electronic control unit estimates the sight-line conical area such that the cross-section perpendicular to the sight-line vector is enlarged in a moving direction of the object from a viewpoint of the driver when a moving speed of the object from the viewpoint of the driver is equal to or greater than a moving speed threshold value.

6. The visual recognition determination device according to claim 2, wherein the electronic control unit increases a magnification of the sight-line conical area until the driver is determined not to visually recognize the object after the driver has been determined to visually recognize the object in comparison with before the driver has been determined to visually recognize the object.

7. The visual recognition determination device according to claim 1, wherein the electronic control unit decreases a magnification of the sight-line conical area based on a distance from the eye point when a vehicle speed of the vehicle is equal to or greater than a vehicle speed determination threshold value in comparison with a case in which the vehicle speed is less than the vehicle speed determination threshold value.

8. The visual recognition determination device according to claim 1, wherein the electronic control unit estimates the sight-line conical area such that the cross-section perpendicular to the sight-line vector is enlarged in a turning direction of the vehicle when the vehicle is turning in comparison with a case in which the vehicle is not turning.

9. The visual recognition determination device according to claim 1, wherein the electronic control unit estimates the sight-line conical area such that the cross-section perpendicular to the sight-line vector is enlarged in a moving direction of the object from a viewpoint of the driver when a moving speed of the object from the viewpoint of the driver is equal to or greater than a moving speed threshold value.

10. The visual recognition determination device according to claim 1, wherein the electronic control unit increases a magnification of the sight-line conical area until the driver is determined not to visually recognize the object after the driver has been determined to visually recognize the object in comparison with before the driver has been determined to visually recognize the object.

11. A control method for a visual recognition determination device for determining whether a driver has visually recognized an object detected by an external sensor of a vehicle, the control method comprising:

estimating a sight-line vector of the driver using a driver monitoring camera of the vehicle and estimating a sight-line conical area which widens in a conical shape away from an eye point of the driver with respect to the sight-line vector of the driver;

estimating the sight-line conical area according to a face orientation of the driver; and determining whether the driver has visually recognized the object based on overlap of the sight-line conical area with the object, and wherein the estimation of the sight-line conical area of which a cross-section perpendicular to the sight-line vector has a vertically long elliptical shape when the face orientation of the driver faces a forward direction of the vehicle and the estimation of the sight-line conical area of which the cross-section has a horizontally long elliptical shape when the face orientation of the driver departs laterally from the forward direction of the vehicle.

12. A visual recognition determination device for determining whether a driver has visually recognized an object detected by an external sensor of a vehicle, the visual recognition determination device comprising:

an electronic control unit configured to:

estimate a sight-line vector of the driver using a driver monitoring camera of the vehicle;

estimate a sight-line conical area which widens in a conical shape away from an eye point of the driver with respect to the sight-line vector of the driver; and determine whether the driver has visually recognized the object based on overlap of the sight-line conical area with the object, wherein the electronic control unit estimates the sight-line conical area according to a face orientation of the driver, and wherein the electronic control unit increases a magnification of the sight-line conical area until the driver is determined not to visually recognize the object after the driver has been determined to visually recognize the object in comparison with before the driver has been determined to visually recognize the object.

* * * * *